US012735321B2

(12) United States Patent
Kalinina et al.

(10) Patent No.: US 12,735,321 B2
(45) Date of Patent: Sep. 15, 2026

(54) HIGHLY DISPERSIBLE GRAPHENE MATERIAL

(71) Applicant: YAZAKI CORPORATION, Tokyo (JP)

(72) Inventors: Irina Kalinina, Camarillo, CA (US); Douglas Meyers, Los Angeles, CA (US); Satyabrata Raychaudhuri, Thousand Oaks, CA (US)

(73) Assignee: YAZAKI CORPORATION, Tokyo (JP)

( * ) Notice: Subject to any disclaimer, the term of this patent is extended or adjusted under 35 U.S.C. 154(b) by 606 days.

(21) Appl. No.: 18/313,806

(22) Filed: May 8, 2023

(65) Prior Publication Data

US 2023/0322560 A1 Oct. 12, 2023

Related U.S. Application Data

(63) Continuation of application No. PCT/US2021/058283, filed on Nov. 5, 2021.

(Continued)

(51) Int. Cl.
*C01B 32/192* (2017.01)
*C01B 32/196* (2017.01)

(52) U.S. Cl.
CPC .......... *C01B 32/192* (2017.08); *C01B 32/196* (2017.08); *C01P 2004/20* (2013.01)

(58) Field of Classification Search
CPC ... C01B 32/192; C01B 32/196; C01P 2004/20
See application file for complete search history.

(56) References Cited

U.S. PATENT DOCUMENTS 10,773,954 B2 9/2020 Cesareo et al.
2016/0194207 A1 7/2016 Bassani et al.

(Continued)

FOREIGN PATENT DOCUMENTS

EP 3736251 A1 11/2020
WO 2017060497 A1 4/2017

OTHER PUBLICATIONS

Sun, Zhenyu, et al. "Supercritical fluid-facilitated exfoliation and processing of 2D materials." Advanced Science 6.18 (2019): 1901084.*

(Continued)

*Primary Examiner* — Richard M Rump
(74) *Attorney, Agent, or Firm* — Ashurst Perkins Coie US LLP; Viola T. Kung

(57) ABSTRACT

The present invention provides an efficient and effective method to produce a graphene material by a high shear mechanical process to exfoliate a natural graphite dispersion in a solvent, followed by supercritical exfoliation and drying. The method exfoliates all graphitic flakes into mostly few-layer graphene flakes. This method is more efficient than traditional mechanical exfoliation techniques and completely avoids the need of multiple sampling/centrifugation cycles. The graphene flakes are generally uniform in both size (area) and thickness and show no clumping or aggregation. After drying, this graphene material has high dispersibility in a suitable solvent; the prepared graphene dispersion is stable for at least three months and shows no indication of settling or separation.

20 Claims, 9 Drawing Sheets

Related U.S. Application Data

(60) Provisional application No. 63/112,837, filed on Nov. 12, 2020.

(56) References Cited

U.S. PATENT DOCUMENTS

| | | | |
|---|---|---|---|
| 2017/0190581 | A1 | 7/2017 | Cesareo et al. |
| 2018/0019071 | A1 | 1/2018 | Zhamu et al. |
| 2019/0062517 | A1 | 2/2019 | Steiner, III et al. |

OTHER PUBLICATIONS

Tomai, Takaaki, Yuji Kawaguchi, and Itaru Honma. "Nanographene production from platelet carbon nanofiber by supercritical fluid exfoliation." Applied Physics Letters 100.23 (2012).*

Rangappa, Dinesh, et al. "Rapid and direct conversion of graphite crystals into high-yielding, good-quality graphene by supercritical fluid exfoliation." Chemistry—A European Journal 16.22 (2010): 6488-6494.*

Karagiannidis, Panagiotis G. et al., Microfluidization of Graphite and Formulation of Graphene-Based Conductive Inks, ACS Nano, Jan. 19, 2017, pp. 2742-2755, vol. 11, American Chemical Society.

European Patent Office (EPO), Extended European Search Report, EP No. 21892615.2, Jan. 1, 2025.

Shang, Tianyu et al., "Production of graphene nanosheets by supercritical CO2 process coupled with micro-jet exfoliation", Fullerenes, Nanotubes and Carbon Nanostructures, vol. 25, No. 12, Apr. 21, 2017, pp. 691-698.

Karagiannidis, P.G. et al., "Microfluidization of graphite and formulation of graphene-based conductive inks", Nov. 10, 2016.

Sun, Zhenyu et al., "Supercritical Fluid-Facilitated Exfoliation and Processing of 20 Materials", Advanced Science, vol. 6, No. 18, Jul. 24, 2019, Germany.

Li, Lei et al., "Preparation of graphene nanosheets by shear-assisted supercritical CO2 exfoliation", Chemical Engeneering Journal, vol. 284, Aug. 28, 2015, pp. 78-84, Amsterdam, Netherlands.

United States Patent & Trademark Office (USPTO), International Search Report, PCT/US2021/058283, Feb. 22, 2022.

* cited by examiner

INVENTION

COMPARISON MATERIALS

COMPARISON MATERIALS

Mechanical + supercritical exfoliation

Product B

HIGHLY DISPERSIBLE GRAPHENE MATERIAL

This application is a continuation of PCT/US2021/058253, filed Nov. 5, 2021; which claims the benefit of U.S. Provisional Application No. 63/112,837, filed Nov. 12, 2020. The contents of the above-identified applications are incorporated herein by reference in their entirety.

FIELD OF THE INVENTION

The present invention relates to a method to produce a graphene material by a high shear mechanical process to exfoliate a natural graphite dispersion in a solvent, followed by supercritical exfoliation and drying. The present invention also relates to graphene material flakes having in general uniform size and uniform thickness, with at least 90% of flakes having thickness less than 25 nm.

BACKGROUND

Graphene, according to a strict scientific definition, is an allotrope of carbon consisting of a single layer of atoms arranged in a two-dimensional honeycomb lattice. Graphene is a $sp^2$ hybridized form of carbon, that is, a graphitic form of carbon. Various remarkable properties have been attributed to graphene, for example, high electrical and thermal conductivity, strength at least 100 times greater than that of steel, uniform absorption of light across the visible and near-infrared parts of the spectrum, and potential suitability for use in spin transport. Graphene has very high electron mobility and offers high levels of electronic conduction due to the occurrence of a free pi($\pi$) electron for each carbon atom. However, true single-layer graphene (SLG) can currently be purchased only in small quantities mostly for laboratory use, and wide-scale industrial application of true graphene is not expected unless current issues of high cost and low throughput are adequately addressed.

In practice, the scientific and industrial communities use the word "graphene" in reference to various carbon-based materials that are not actually SLG. For example, the term "few-layer graphene", or FLG, has been used to refer to a carbon-based material consisting of flakes having between 2 and 5, or between 2 and 10 atomic layers, depending on the reference source. The term "graphene nanoplatelets", or GNP, has been used to refer to graphitic carbon in the form of flakes up to 25 atomic layers thick, or up to 50 atomic layers thick, again depending on the reference source. Carbon in the form of flakes with greater than 25 layers, or greater than 50 layers, is often referred to as "graphite", although some refer to such material as "micrographite". Functionalized graphene materials such as graphene oxide (GO) and reduced graphene oxide (rGO) are also often referred to in the literature simply as "graphene".

Atomic force microscopy or AFM is a common technique used to observe the morphology and especially, thickness of individual graphene flakes, i.e. SLG, FLG, GNP, etc. Imaging and thickness measurement of graphene flakes is relatively easy with AFM. Statistical AFM data on flake thickness, while laborious to collect, can reveal the quality of a particular batch of graphene in terms of the overall distribution of flake thicknesses (and areas) within the batch. However, reference sources have given a variety of values for the thickness of an SLG flake, varying between about 0.4 nm and 1.7 nm. While the interlayer spacing in graphite is known to be about 0.34 nm, in practice it is difficult to reproduce this number when measuring the thickness of graphene flakes via AFM, and the measured thickness is often greater than the theoretical thickness. For example, some published articles have used 0.5 nm, while others have used 1.0 nm as a conversion factor for estimating the number of atomic layers from AFM thickness measurements.

For this reason, AFM thickness measurements in nm cannot be converted directly into thickness in terms of atomic layers. However, AFM is still a useful and practical method for comparing the relative quality of different graphene materials. It is generally accepted that thinner graphene flakes (SLG, FLG, GNP) are preferable over thicker flakes as they tend to have more "graphene-like" and less "graphite-like" character.

While FLG and GNP may not exhibit the same unique properties as SLG, they do still display extraordinary and useful electrical and thermal conductivity, mechanical properties, high chemical stability and non-toxicity, which play a crucial role in a variety of applications such as composites, displays, sensors, medical devices, and energy storage. Currently, graphene dispersions are widely studied for use in printed electronics and surface coatings, prepared by printing, vacuum filtration, and spray coating.

However, widespread application of graphene materials is hindered by the fact that the commercially available materials are of generally low quality. These commercial graphene materials contain a large proportion of graphite. They also have a wide distribution of flake size (i.e., area), typically varying from less than 1 μm to hundreds of microns. Some commercial graphene materials also show a high level of defects in their carbon bond structure, as determined by the ratio of the intensities of the D-band (representing $sp^3$ hybridized carbon) and G-band (representing $sp^2$ hybridized carbon) in their Raman spectra. Such low-quality graphene materials do not exhibit the expected levels of electrical/thermal conductivity, or mechanical strengthening when used in composites. They are also difficult to disperse and apply as a coating or film due to the large fraction of graphite flakes.

The separate layers of graphene in graphite are held together by van der Waals forces, which can be overcome during exfoliation of graphite into graphene. Exfoliation in this context indicates a process that overcomes the van der Waals forces holding together the individual atomic carbon layers, thereby separating thicker graphite flakes into SLG, FLG, or GNP. This is accomplished, for example, by subjecting the graphite to sufficiently high mechanical shear forces.

Researchers have developed many different methods for graphene production, which could be generally classified as bottom-up and top-down techniques. However, both routes have some disadvantages. The bottom-up techniques, such as micromechanical cleavage, chemical vapor deposition, and growth on different substrates are extremely challenging to use for effective mass production in contrast to the top-down techniques. Among main top-down methods, graphite can be exfoliated by mechanical and chemical (oxidation-reduction) routes. Chemical exfoliation process produces defective graphene materials, such as graphene oxide and reduced graphene oxide with low conductivity. Mechanical exfoliation is simpler and scalable, with no harsh chemicals involved. In the past few years, supercritical fluids have been explored for the exfoliation of graphite in carbon dioxide, ethanol, and dimethylformamide. However, these methods do not achieve complete exfoliation, and unexfoliated material, i.e., residual graphite flakes, need to be removed by multiple sampling/centrifugation cycles, making the processes expensive and impractical for commercial scale production.

Currently known techniques to prepare a graphene material often result in a heterogeneous dispersion of flakes with different sizes (lateral sizes ranging from tens of nanometers to tens of microns) and thicknesses (number of individual carbon layers ranging from one to several hundred or more). Since structural parameters heavily influence mechanical, electrical, and other types of properties, highly polydispersed materials may cause unpredictable behavior, which is a critical bottleneck for many applications.

There is a need to develop a new and simpler graphene synthesis method using inexpensive starting graphite materials with no harsh chemicals or high temperatures involved.

DETAILED DESCRIPTION OF THE INVENTION

Definition

Figure 1:
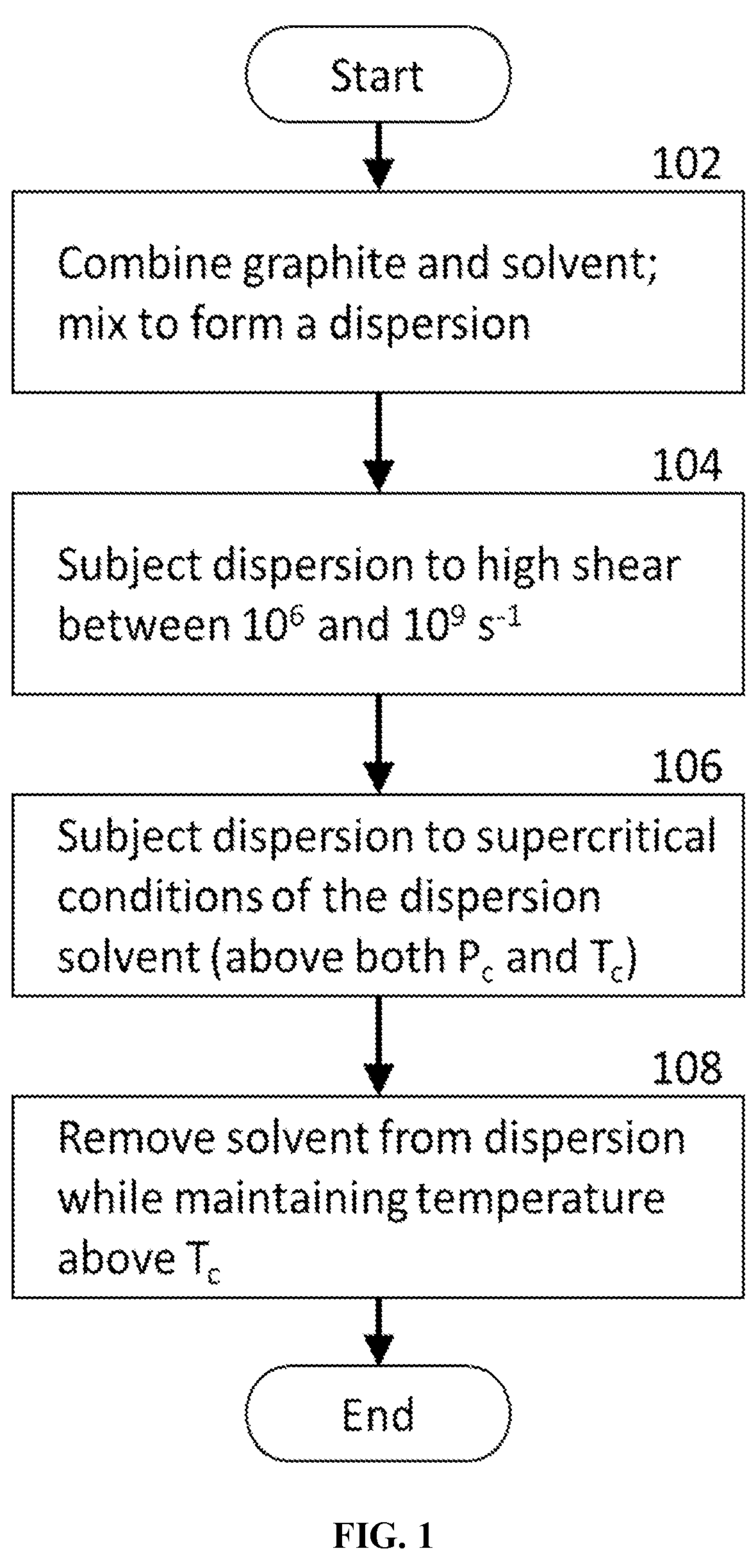
FIG. 1: Block diagram of a process to make graphene from graphite via mechanical and supercritical exfoliation. Tc: critical temperature. Pc: critical pressure.

The terms "graphene" or "graphene material", as used herein, are interchangeable, and are both defined as a mixture of graphitic carbon flakes having a thickness of 25 nm or less, as measured by AFM. The terms graphene or graphene material refer to a material consisting of flakes of SLG, FLG, GNP, or any mixture of the three in any ratio. Carbon flakes with thickness >25 nm are herein defined as "graphite".

A "supercritical fluid" is any substance at a temperature and pressure above its critical point, where distinct liquid and gas phases do not exist, but below the pressure required to compress it into a solid.

"Supercritical conditions" are characterized by the critical temperature, critical pressure, and concentration of initial reactant in a solvent that creates a supercritical fluid. For example, critical temperature and critical pressure of water are about 374° C., and about 3200 psi. Critical temperature and pressure of IPA are about 235.3° C. and 690 psi.

The present invention provides an efficient and economic graphene synthesis method using inexpensive starting graphite materials with no harsh chemicals or high temperatures involved. The present method provides high-quality graphene materials, with most individual particles or flakes less than 10 nm thick (i.e., FLG), in bulk quantities, with a high degree of uniformity and homogeneity among the individual flakes, in terms of the number of carbon layers (thickness) and size (planar area) of each flake. Such materials are useful for applications as thin film coatings for electrical, electronic, or sensor devices, as anti-corrosive or flame-retardant coatings, or as an additive in polymer, metal, or ceramic matrix composites for enhancement of electrical, thermal, or mechanical properties. The present method is scalable up to the industrial level and cost-efficient.

The present invention is directed to a method to prepare a graphene material comprising the steps of: (a) dispersing graphite powder in a solvent to form a dispersion; (b) shearing the dispersion with a shear rate between $10^6$ and $10^9$ $s^{-1}$ to exfoliate the graphite into a graphene material; (c) heating the sheared dispersion of step (b) to reach supercritical conditions of the solvent and maintain supercritical conditions for a period of time; (d) drying the graphene material by removing the solvent from the dispersion while the dispersion is held above the critical temperature of the solvent, to preserve the exfoliated condition of the graphene material. The present method combines and optimizes several individual steps including exfoliation via mechanical and supercritical fluid techniques. The method provides graphene materials with little to no structural damage, and having a high degree of uniformity in both flake size and thickness.

The starting material is preferably a high purity graphite powder, to ensure that the properties of the final graphene material product are not compromised by contamination. The graphite is preferably at least 99% pure, more preferably at least 99.5% or 99.9% pure. The graphite powder may be, for example, a natural graphite obtained from a mine, or a synthetic graphite. Natural graphite is preferred primarily for cost reasons. Natural graphite is commercially available in high quality and high purity, and is produced in high volume. Examples of such materials include natural crystalline graphite from RS Mines (Sri Lanka), or Graphit Kropfmühl GmbH (Germany). The starting material preferably does not contain expandable graphite, which is pretreated with an intercalating compound and adds cost and impurities to the process.

The method of the invention for making graphene from graphite is summarized in FIG. 1. In 102, the graphite powder is first combined with a suitable solvent and dispersed to form a mixture in a suitable container. Suitable solvents have critical temperatures and pressures that are within the capability of existing laboratory or industrial equipment, in terms of pressure and temperature. Suitable solvents are chemically compatible with the equipment. For example, the equipment used in the process may have O-rings, seals, fittings, etc., that come in contact with the dispersion, so the materials these components are composed of need to be resistant to the selected solvent. Suitable solvents include organic solvents such as isopropanol (IPA), ethanol, butanol, dimethyl formamide (DMF), N-methyl-2-pyrrolidone (NMP), tetrahydrofuran (THF), toluene, ortho-dichlorobenzene, and N,N-dimethylacetamide. IPA, ethanol, DMF, and NMP are preferred solvents. Suitable solvents also include an aqueous solvent such as water. However, an ionic or a non-ionic surfactant (for example, sodium deoxycholate) may be added to keep the graphite suspended in water and not settle out. The listed organic solvents have much lower critical pressures between about 40 and 63 bar, or about 580-914 psi, in comparison with that of water, i.e. 220 bar or about 3200 psi.

The mixture is then mixed to form a dispersion, for example, by sonication, mechanical stirring, homogenizer mixing, and/or rotor-stator mixing. To effectively break up the graphite powder particles and evenly disperse them in the solvent, sonication time is in general between 1 and 3 hours and shear mixing time between 30 min and 1 hour. The concentration of graphite in the dispersion may be 1-100 g/L, preferably 3-48 g/L, and more preferably 6-24 g/L. The preferred concentration range is selected to provide an appropriate balance between process efficiency and effective exfoliation of graphite into graphene. Higher concentrations increase productivity but somewhat reduce the exfoliation effect and product quality. Lower concentrations yield a better quality of graphene material but at the expense of throughput.

In 104, the dispersion is subjected to a high shear rate to exfoliate the graphite into a graphene material. High shear rate refers to a shear rate between $10^6$ and $10^9$ $s^{-1}$. Any method that can achieve such shear rates is within the scope of the invention. In one embodiment, the high shear rate is achieved by passing the dispersion through an orifice under high pressure. Commercial equipment for processing the dispersion in this manner are available. Passing the dispersion through an orifice under high pressure is a preferred method over other mechanical exfoliation methods because the high shear rate can be applied to the entire dispersion. Process parameters such as orifice size, applied pressure, and concentration of graphite in the dispersion can be optimized. For example, a smaller orifice and/or higher system pressure both result in further exfoliation, thinner flakes, and greater specific surface area, due to the cumulative effect on the graphite particles or the increased shear force applied to them. Higher initial concentration of graphite in the dispersion allows a greater amount of graphene material to be prepared within a given time.

In one embodiment, the dispersion is passed through an orifice having a size of 200 μm or less, preferably 100 μm or less.

In one embodiment, the dispersion is passed through an orifice while under an applied pressure of between about 20,000 and about 40,000 psi, preferably between about 25,000 and 35,000 psi.

In one embodiment, the dispersion is passed through an orifice having a size of 100 μm or less, while under an applied pressure of between about 25,000 and 35,000 psi.

It may be advantageous to pass the dispersion multiple times through the orifice under pressure. Such repeated high shear processing can provide enhanced exfoliation, thinner flakes, and greater specific surface area, due to the cumulative effect on the graphite particles. In one embodiment, the dispersion is passed through the orifice between 10 and 200 times, preferably between 50 and 150 times.

Graphene is formed within the dispersion after the high shear process of 104. However, the subsequent steps 106 and 108 are important for preserving the exfoliated condition of the graphene material when it is processed into a dry powder.

In 106, the sheared dispersion is processed by supercritical exfoliation by placing an appropriate quantity of the dispersion into a pressure vessel or autoclave such that supercritical conditions of the solvent can be achieved without exceeding the temperature or pressure limits of the vessel. Supercritical conditions are characterized by the critical temperature, critical pressure, and concentration of initial reactant in a solvent that creates a supercritical medium. When a substance is subjected to a pressure and a temperature higher than its critical point, it undergoes a physical change and is described as a "supercritical fluid".

The vessel is heated above the critical temperature of the solvent (for example, 235.3° C. for IPA), and in so doing, with the appropriate quantity of solvent present in the vessel, the pressure in the vessel exceeds the critical pressure of the solvent (for example, 47.6 bar for IPA). In general, the sheared dispersion is heated within 12 and 48 hours from room temperature to above the critical temperature of the solvent. The vessel is held at these conditions for a minimum of about 1 hour, to ensure the full transition of the solvent from liquid and vapor in equilibrium, to a uniform fluid (a supercritical fluid). After this step the conversion of graphite to graphene material is completed.

In 108, the graphene material is dried by removing the solvent from the dispersion while the dispersion is held above the critical temperature of the solvent, so as to preserve the exfoliated condition of the graphene material. The supercritical fluid is slowly removed from the vessel while keeping the vessel temperature constant, by opening a valve that allows control over the rate of outward flow. As the fluid is released, the pressure in the vessel decreases and the fluid converts to vapor. The rate of pressure drop in the vessel is between about 0.5 and 30 psi/min, preferably between 1 and 20 psi/min or 1 and 10 psi/min, and more preferably between 2 and 8 psi/min. The released vapor is condensed back into liquid solvent and recovered for re-use. All vapor is removed and the vessel completely depressurized, then cooled to room temperature. The final product, a graphene powder comprising mostly SLG and FLG, with a smaller proportion of GNP, is removed from the vessel.

Drying of graphene materials in a pressure vessel under supercritical conditions of the dispersing solvent provides further exfoliation and higher specific surface area compared to other drying techniques, while allowing scale-up of the process.

The supercritical treatment and drying steps 106 and 108, at minimum, prevent re-stacking of the graphene into thicker flakes. The supercritical treatment may actually further exfoliate the graphene flakes in the dispersion into thinner flakes. Other drying methods (for example, air drying, oven drying, vacuum drying, freeze drying) can cause re-stacking of exfoliated flakes, resulting in thicker flakes, lower specific surface area, and reduced properties.

When a preferred solvent is used, the present process does not require high pressures (above about 100 bar or about 1450 psi), which would be a significant obstacle to large scale production, because pressure vessels that can withstand higher pressures than this tend to be quite costly, especially on an industrial scale.

In the present process, once the dispersion is prepared, the dispersion is moved from one step to the next, preferably without any alteration, modification, or disruption, until the last step when dry graphene powder is obtained as the final product. The present process is efficient, and does not require multiple post-processing steps of washing, filtering and drying. The present process also does not require a centrifugation step after exfoliation to separate unexfoliated material from graphene. The process is fully scalable for commercial use, most easily by increasing the size of the mechanical exfoliation equipment and/or the pressure vessel.

In the present process, greater than 90% of the solvent is easily recoverable and reusable. Only slight process-related losses occur. The present process does not require the use of multiple solvents or any solvent exchange procedures, as would be required, for example, if drying under supercritical conditions of carbon dioxide ($CO_2$).

The present process produces highly uniform non-damaged graphene flakes with no impurities, with a narrow combustion temperature range, and high specific surface area.

The graphene material obtained by this process has highly uniform flake size (area) and flake thickness (number of carbon layers), as a result of (i) using a micron-range graphite powder starting material; (ii) exfoliating the graphite into graphene by applying a high-shear process, by passing the dispersion through an orifice at high pressure, and (iii) further exfoliating and drying the material under supercritical conditions of the dispersion solvent, which reduces flake thickness (number of carbon layers), while preserving the flake size obtained in the final dried powder material.

In one embodiment, the present invention is directed to a graphene material having <20% or <10% unexfoliated graphite with flakes >25 nm in thickness, as determined by statistical analysis via atomic force microscopy (AFM).

In one embodiment, the present invention is directed to a graphene material having >80%, >85%, or >90% of flakes with thickness less than 25 nm.

In one embodiment, the present invention is directed to a graphene material having >60%, or >65%, or >70% of flakes with thickness less than 10 nm, as determined by statistical analysis via AFM.

In one embodiment, the present invention is directed to a graphene material having >80%, >85%, or >90% of flakes with thickness less than 25 nm, and having >60%, or >65%, or >70% of flakes with thickness less than 10 nm, as determined by statistical analysis via AFM.

In one embodiment, the present invention is directed to a graphene material having a mean flake thickness of about 8-12 nm, or of about 10 nm.

The graphene materials of the present invention are dispersible in an organic solvent such as IPA, with no additional ingredients such as dispersants or surfactants, and the dispersion is stable for at least 3 months, showing no settling, separation, or aggregation, while dispersion of commercial products show complete separation and settling of solid material within about one day.

The stable dispersions of the graphene materials of the present invention are useful for applying thin films or coatings by, for example, spray coating, dip coating, inkjet printing, screen printing, stencil printing, and the like. Such films may be useful in applications such as anti-corrosion coatings, thermal barrier coatings, electromagnetic interference (EMI) shielding, or as conductive or active electrode layers in energy storage devices. Stable dispersions of graphene are also useful for adding graphene as a filler to polymers in an extrusion compounding process, to create a composite material having improved mechanical, electrical, and/or thermal properties. Such composites may be useful, for example, as structural components, EMI shielding layers, thermal barriers or insulators, or as flame retardants.

The following examples further illustrate the present invention. These examples are intended merely to be illustrative of the present invention and are not to be construed as being limiting.

EXAMPLES

Example 1. Mechanical and Supercritical Exfoliation of Graphite Dispersion in IPA A graphite dispersion with a concentration of 6 g/L was prepared by combining 3.6 grams of natural crystalline graphite powder (Graphit Kropfmühl/AMG Graphite type SGA 20, mean particle size 20 μm) in 0.6 L of IPA. The mixture was processed for 3 hours by bath sonication followed by 1 hour of rotor-stator mixing to form a dispersion. The full volume of the dispersion was then subjected to a high shear process (>$10^6$ $s^{-1}$), by passing it through a 100-μm orifice under a pressure of 30,000 psi. The exfoliated material dispersed in IPA was transferred to a glass beaker, which was then placed inside a 1-liter stainless steel pressure vessel. The vessel was sealed and then heated to 240° C. within 48 hours, before removing the IPA and thereby drying the graphene material.

The detailed procedure for drying in the pressure vessel was as follows:

(a) Graphene/IPA dispersion was weighed out in a glass beaker, which was then placed inside the vessel. For the 6 g/L dispersion, 183 g dispersion was used, corresponding to about 181.6 g of IPA and about 1.4 g of graphene material.

(b) The vessel was heated from room temperature to 240° C. within 48 hours.

(c) During heating, pressure and temperature were monitored and logged to ensure the conditions followed the liquid-vapor equilibrium curve for IPA, and exceeded critical conditions after reaching 240° C. Critical temperature and pressure of IPA are ~235.3° C. and ~47.6 bar (690 psi). In this Example, the maximum pressure reached at 240° C. was 740 psi. Therefore, supercritical conditions were achieved.

(d) The vessel was held at 240° C. for about 1 hour, then depressurized by slowly releasing the supercritical IPA fluid over a period of about 3 hours using a low-flow stainless steel metering valve. The rate of depressurization was about 4 psi/min. The released IPA fluid was condensed and recovered for recycling or re-use.

(e) After reaching atmospheric pressure, nitrogen was passed through the vessel to ensure all IPA vapor had been purged. The vessel was cooled naturally to room temperature and the dried graphene material was then removed and characterized.

For the quality and purity evaluation of the final graphene product, various microscopic and spectroscopic techniques were used, such as thermogravimetric analysis (TGA), Raman spectroscopy, scanning electron microscopy in secondary and transmission modes (SEM/STEM), atomic force microscopy (AFM), and nitrogen physisorption analysis (BET surface area). The results were compared side-by-side with comparable commercially available graphene materials (Product A and Product B).

Scanning Electron and Scanning Transmission Electron Microscopies (SEM/STEM)

Figure 2:
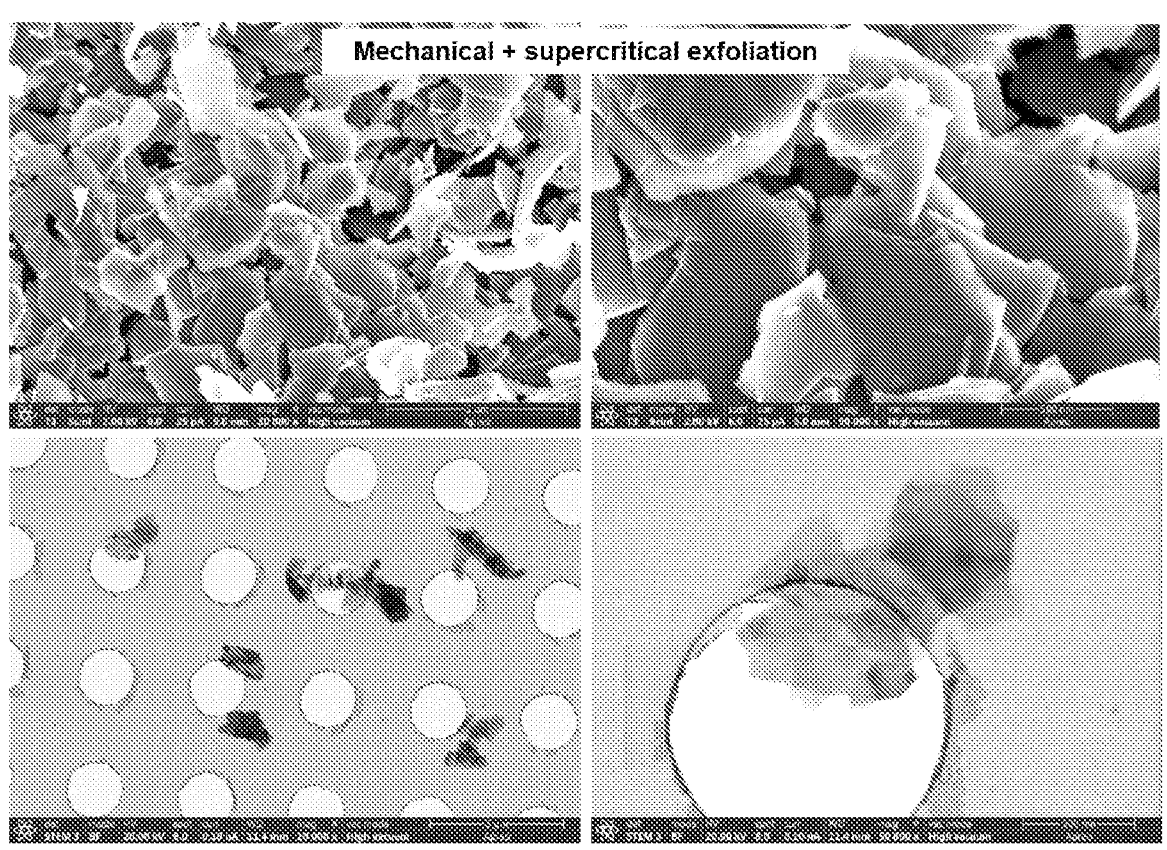
FIG. 2: SEM/STEM images of invented graphene material.

SEM/STEM images of the graphene materials products were recorded at various voltages and magnifications to obtain topographical and morphological information of the graphene materials. Based on the microscopy images, the invented method leads to successful exfoliation of all graphite flakes into mostly few-layer graphene (FLG) flakes having thickness of 10 nm or less, with areal size between about 0.5 and 1.0 μm. Based on the STEM images, the graphene flakes were generally translucent to the electron beam, uniform, and showed no clumping or aggregation (FIG. 2). In comparison, Product A and Product B commercial graphene materials showed sizable presence of opaque flakes with widely varying areal size (FIG. 3).

Figure 3A:
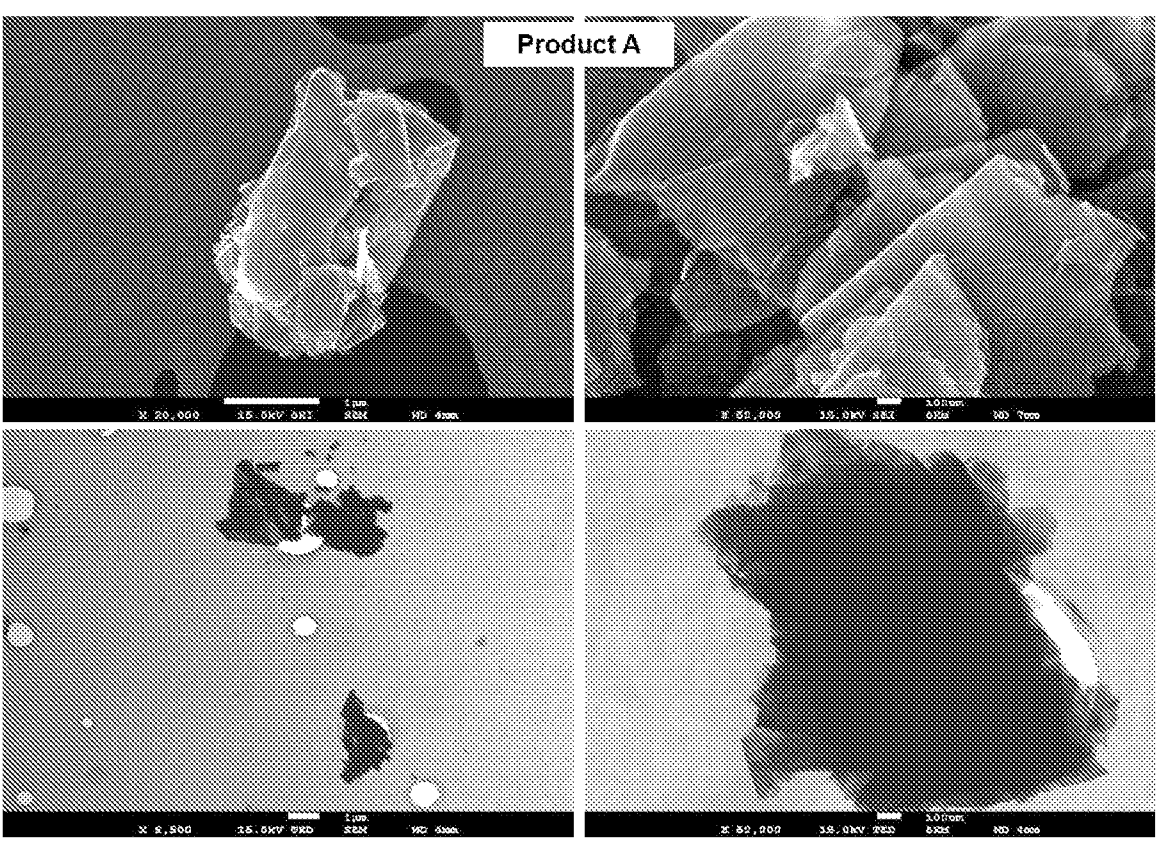
FIGS. 3A-3B: (Comparative) SEM/STEM images of commercial products.
Figure 3B:
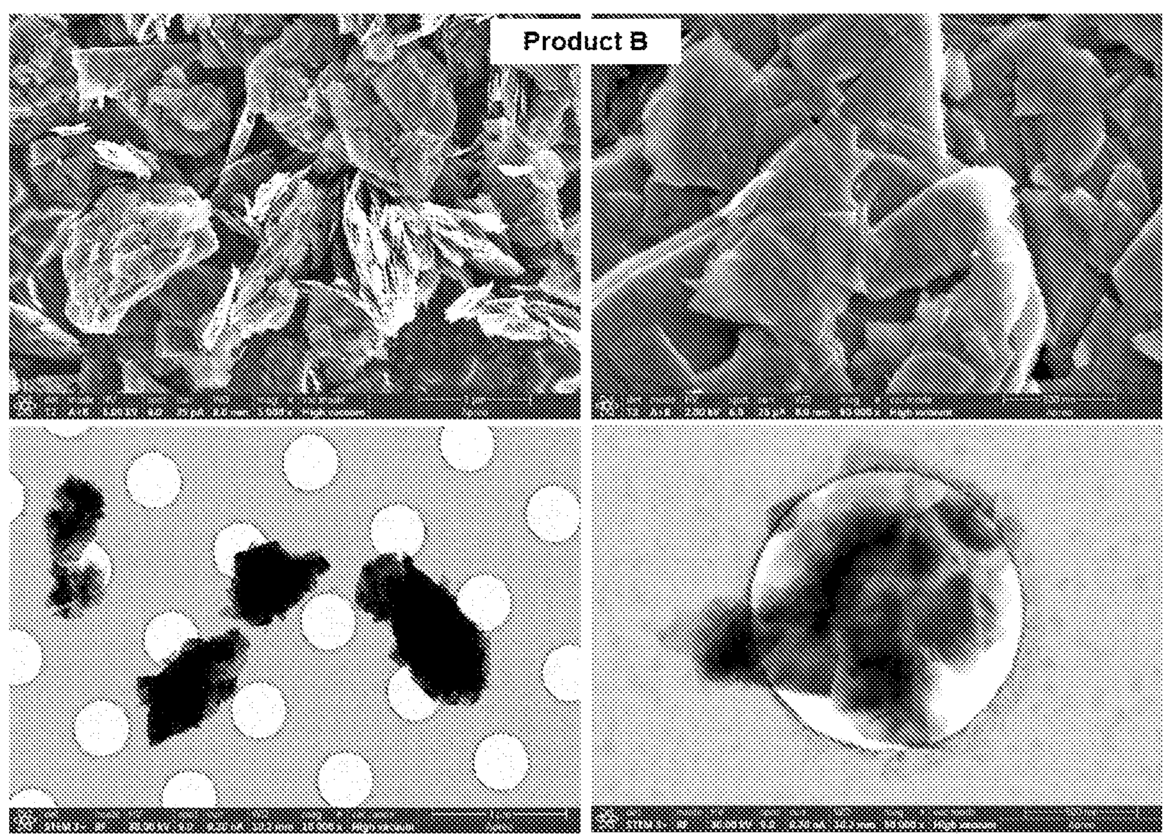

The purpose of FIGS. 2 and 3 is to compare the appearance of the graphene flakes made by the present process, shown in FIG. 2, against the appearance of the commercial materials shown in FIG. 3. There are two types of micrographs shown. The top set of two images are SEM images taken in "secondary electron" mode, which is the standard SEM mode. This mainly provides information on surface features and topography of the material. The bottom set of two images are in transmission mode (STEM). In these images we are looking "through" the material. In the STEM images the grey background with white circular shapes is a carbon film, i.e. a sample holder, on which the graphene flakes are deposited for observation.

FIG. 2 (top and left) shows that the flakes of the present invention are highly uniform in size, i.e. area (~0.5-1.0 μm per side). The flakes of commercial materials (Products A and B) shown in FIG. 3 are larger and have a much wider distribution of sizes. The uniformity in size of flakes of the present invention provide advantages in that the properties and behavior of the material are more consistent and predictable.

FIG. 2 (bottom right) shows that graphene flakes of the present invention are translucent to the electron beam, i.e. they are extremely thin, with most flakes consisting of 10 or fewer atomic carbon layers. In contrast, the commercial graphene materials have a large proportion of much thicker flakes that appear completely opaque (dark), as seen in the bottom images for Products A and B in FIG. 3. These flakes are more accurately described as graphite rather than graphene. The invented material having predominantly thin flakes (>90% having thickness <25 nm) is advantageous for use as, for example, a conductive coating, or as a conductive filler in a polymer matrix composite to enhance its thermal, electrical or mechanical properties such as its electrical conductivity, thermal conductivity, or tensile strength.

Atomic Force Microscopy Analysis (AFM)

Graphene produced by the method described in this Example, and comparable commercial materials Product A and Product B, were each dispersed in dimethylformamide (DMF) by sonication for 1 hr and deposited dropwise onto freshly cleaved mica substrates. AFM was carried out under ambient conditions in tapping mode. Imaging was accomplished in the regime of tip-sample interaction, recording height, Z Sensor, amplitude, and phase retrace simultaneously. For each material, a statistically significant number of individual flakes were measured for thickness, to generate a distribution of the proportion of flakes in the material, versus thickness. Typical 2D and 3D images of the invented graphene material and commercial materials are shown in FIG. 4.

Figure 4:
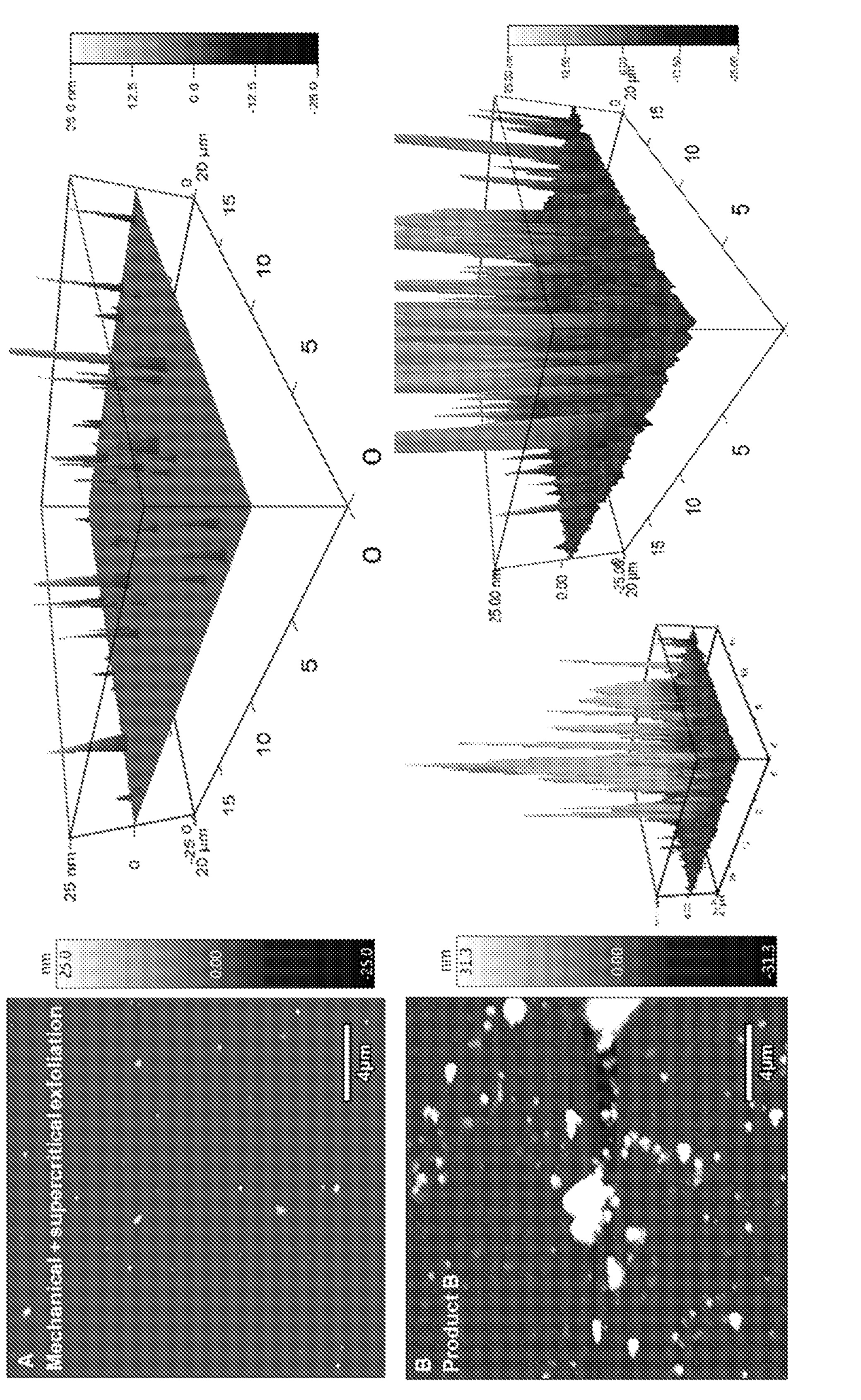
FIG. 4: 2D and 3D AFM images of (A) graphene material of the current invention; (B) Commercial Product "B".

The 2D images on the left of FIG. 4 indicate where the graphene flakes are located on the mica substrate. The graphene flakes appear as white irregular shapes and the bare mica is dark grey. FIG. 4, top left image (A) is the graphene material of the present invention, in which the flakes appear as white specks and are all quite small, <1 μm per side. In the bottom left image (B) of the commercial material, there are large flakes up to 4-5 μm, and small flakes as well.

The 3D images on the right of FIG. 4 show the approximate heights of the flakes that appear in the 2D images. The positions of the "spikes" sticking up in the 3D image correspond to the locations of flakes in the 2D image.

Based on AFM analysis, graphene materials prepared by the method of the present invention show a range of individual flake thickness from 1 to 120 nm. In comparison, Product A and Product B were found to have flakes in the range of 3-900 nm and 1-1000 nm, respectively.

To generate the statistical data, the inventors measured the height of each flake individually. For the invented material, Product A, and Product B, the inventors made 1026, 785, and 1017 measurements of individual flakes, respectively; these measurements provide a clear differentiation between the quality of the materials (FIG. 5).

Figure 5:
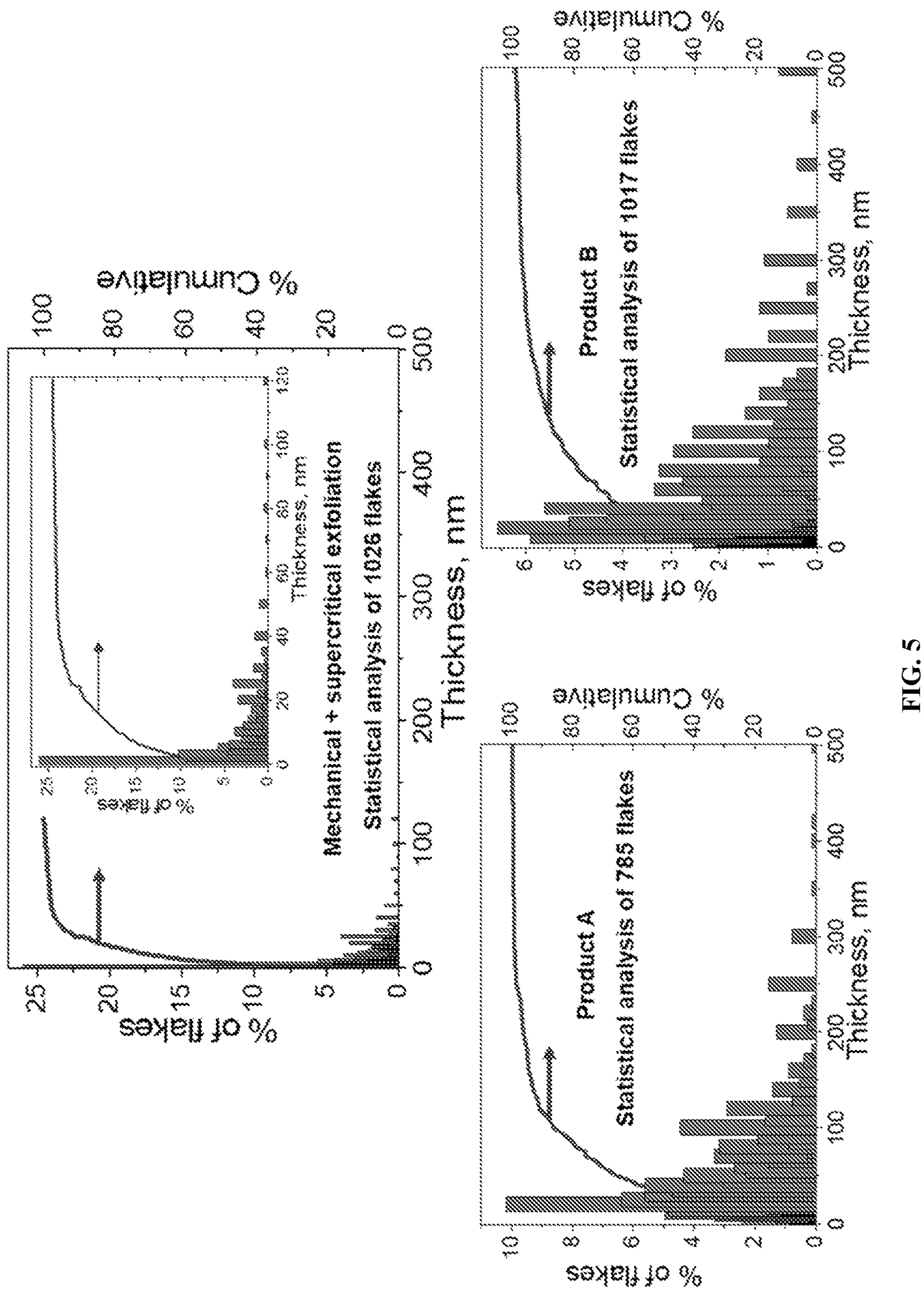
FIG. 5: Statistical distribution of flake thickness for graphene material of the current invention (top), and commercial graphene Products A (bottom left) and B (bottom right).

FIG. 5 shows the distribution of flake thicknesses for each material, in terms of the percentage of all flakes measured. For clarity, the x-axis (thickness) in these plots is limited to 500 nm for all materials, with an inset providing additional clarity for the invented graphene material. The solid line in each chart shows the cumulative % data and the arrows direct to the secondary y-axis (% cumulative), on the right of each chart. The difference in thickness distribution between the invented graphene material and the commercial products is readily apparent.

Figure 6:
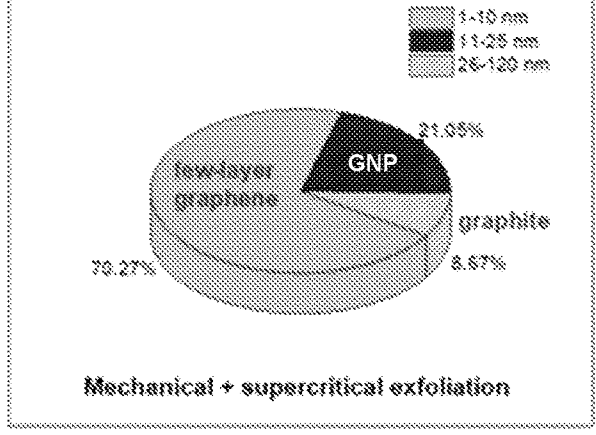
FIG. 6: Proportions of few-layer graphene (FLG), graphene nanoplatelets (GNP), and graphite in graphene material of the current invention (top), and commercial graphene Products A (bottom left) and B (bottom right).
Figure 6:
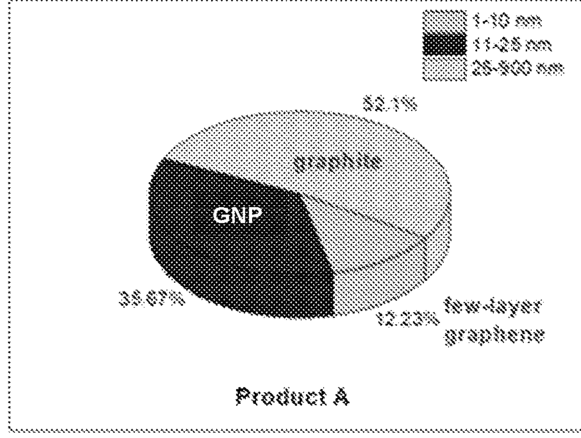
Figure 6:
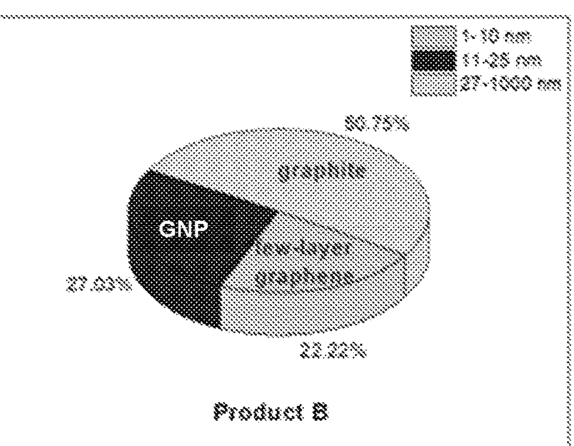

Further data analysis reveals that 91% of flakes of the invented graphene material are in the range of 1-25 nm, with 70% of flakes 1-10 nm thick, and 21% of flakes 11-25 nm thick, as shown in FIG. 6. In contrast, only 48-49% of Product A and Product B flakes are in the range of 1-25 nm in thickness. The commercial materials comprise a mixture of few-layer graphene (FLG), graphene nanoplatelets (GNP), and unexfoliated graphite flakes, with the latter present in excess of 50% of all flakes. The mean flake thickness of graphene material prepared by the method of the invention, based on measurement of 1026 individual flakes, was 10 nm. The mean flake thicknesses of Products A and B were 43 nm and 21 nm, based on measurement of 785 and 1017 individual flakes, respectively.

Thermogravimetric Analysis (TGA)

TGA measurements were conducted using a Pyris1 analyzer (Perkin Elmer, Waltham, MA), and the weight was recorded as a function of increasing temperature. The measurements were carried out with the sample in a purified air atmosphere with a gas flow rate of 20 mL/min. Samples were heated from 25° C. to 120° C. at 20° C./min and held at 120° C. for 60 min, then heated from 120° C. to 900° C. at 5° C./min and held at 900° C. for 2 hr.

Figure 7:
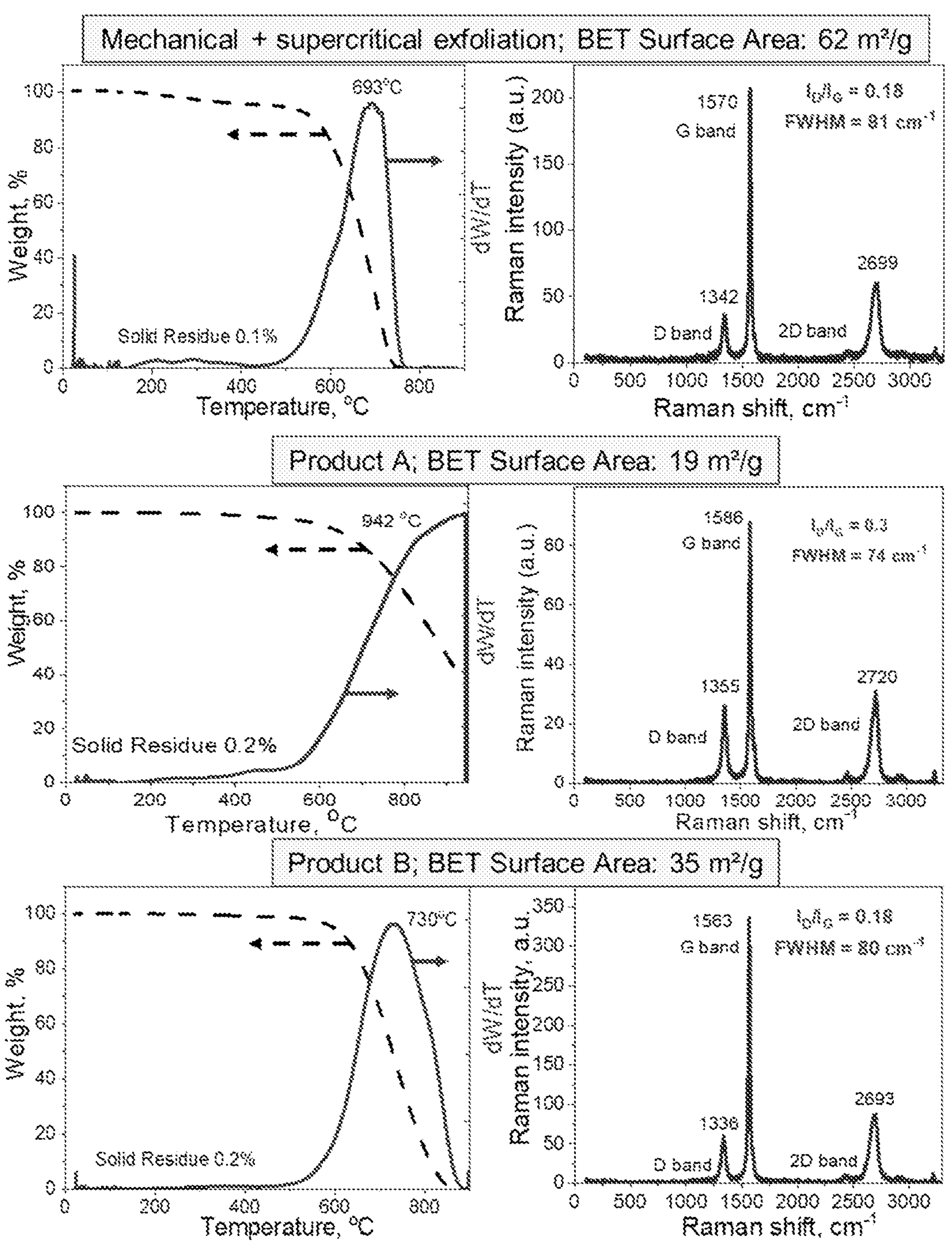
FIG. 7: TGA, Raman, and BET surface area data for graphene materials of the current invention (top), and commercial graphene Products A (middle) and B (bottom).

Characteristics of the different graphene materials can be compared qualitatively by looking at the derivative weight loss curves for each, as shown in FIG. 7. The material prepared by the current method shows a narrow combustion range, with the peak occurring at the relatively low temperature of 693° C. Combustion is already complete when the temperature has reached about 750° C. In contrast, commercial Product A shows a broad combustion temperature range that continued to 900° C. The projected peak combustion temperature was 942° C. Commercial Product B showed a lower peak combustion temperature compared to Product A, but still revealed a much broader combustion range compared to the invented material, with combustion continuing nearly up to 900° C. In the TGA profile, the derivative peak position corresponds to the mean combustion temperature. The derivative peak width is an indication of combustion temperature distribution. Higher combustion temperature and wider combustion temperature distribution for graphene materials correspond respectively to a greater number of carbon layers overall, and a less homogeneous material having flakes with a broader distribution of carbon layers.

Based on the higher combustion temperature and the wider combustion temperature distribution, the commercial graphene materials contain a mixture of exfoliated flakes (SLG, FLG, and GNP) and unexfoliated graphite, since combustion is observed at temperatures of up to at least 900° C. In comparison, the invented graphene material exhibits a lower combustion temperature and very narrow combustion temperature distribution, meaning that the graphene flakes are highly uniform. Additionally, all carbon was consumed before reaching 750° C. confirming that graphite was nearly fully exfoliated into SLG, FLG, and GNP.

Raman Spectroscopy

Raman spectroscopy is extremely sensitive to geometric structure and bonding within molecules. Differences in bonding between the various allotropes of carbon cause different peak shifts or bands in their Raman spectra. Graphene materials characteristically show the bands designated as the G, D, and 2D bands. The G-band corresponds to $sp^2$ hybridized carbon, the normal structure of graphite and graphene, whereas the D-band corresponds to $sp^3$ hybridized carbon bonds, and indicates imperfections or defects in the structure. The 2D-band is the result of a two-phonon lattice vibrational process, and is present in all graphene materials, although it is not indicative of defects. The intensity ratio of the D and G bands ($I_D/I_G$) is a useful index of the concentration of defects in the material.

Raman data of the invented and commercial graphene materials were collected with a 532 nm green laser. As expected, the Raman spectra of all graphene materials contained G, D, and 2D bands. Among the three materials, the highest $I_D/I_G$ ratio of 0.3 (most defects) was calculated for commercial Product A, while Product B showed $Ip/I_G$ ratio of 0.18 (FIG. 7). The material prepared by the method of the invention showed a Raman $I_D/I_G$ ratio of 0.18, as good or better than the commercial materials.

Physisorption Analysis

The specific surface areas of the graphene materials were determined by standard nitrogen physisorption analysis method, following the model of Brunauer, Emmett, and Teller or well-known BET Method.

The BET specific surface area of the invented graphene product, processed by mechanical and supercritical exfoliation of graphite in IPA, was measured at about 62 $m^2/g$. In comparison, commercial Product A and Product B were determined to have specific surface areas of 19 and 35 $m^2/g$, respectively (FIG. 7).

It should be noted that BET surface area determined using the traditional nitrogen adsorption/desorption method, does not accurately describe the true specific surface area of most types of graphene materials. This is due to the tendency of individual flakes to stack on top of one another when in dry powder form, effectively closing off much of the available surface area to adsorption of nitrogen molecules.

The theoretical specific surface area of SLG is 2630 $m^2/g$, and the BET surface area of the invented material is 62 $m^2/g$. Based on these numbers, the average number of atomic layers would then be about 42 (i.e., 2630/62). Via AFM, the invented material showed a mean flake thickness of about 10 nm, which if converted using a graphite interlayer spacing of 0.34 nm equates to about 30 atomic layers.

Products A and B showed BET surface areas of 19 and 35 $m^2/g$, respectively, which based on the theoretical surface area of SLG would equate to about 138 and 75 atomic layers. Whereas, their mean AFM flake thicknesses of 42 and 21 nm, respectively, would equate to about 123 and 62 atomic layers, using a graphite interlayer spacing of 0.34 nm.

Clearly, whether comparing via BET surface area or AFM thickness measurements, the invented material consists of substantially thinner flakes having considerably fewer atomic layers on average than either of the commercial graphene products A and B. Furthermore, the invented material has a much narrower distribution of flake thicknesses.

Example 2

Preparation of Graphene Dispersions in IPA

Figure 8:
FIG. 8: Dispersions in IPA of the graphene material of the current invention (left and middle), and of a comparative commercial Product B (right).
Figure 8:
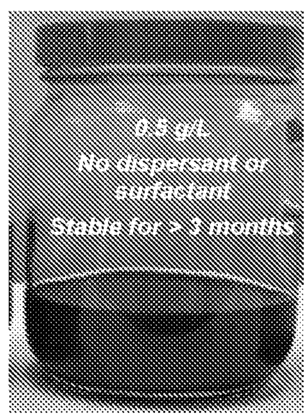
Figure 8:
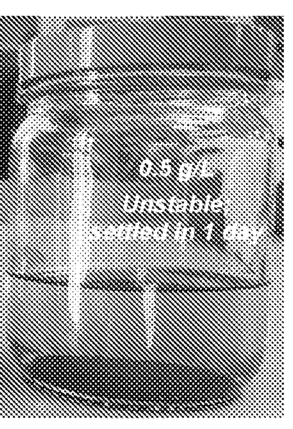

Dispersions of commercial Products A and B, and of the dried powder graphene material of the current Invention, were prepared in IPA by bath sonication for 3 hours, at concentrations of 0.5 g/L and 3 g/L. No dispersant or surfactant was added to the mixtures of graphene materials and IPA. The dispersions of the invented graphene product, processed by mechanical and supercritical exfoliation, were stable for at least 3 months, showing no visible settling, separation, or aggregation precipitated out of the solvent or settled to the bottom of the mixture when no mechanical agitation is applied (FIG. 8, left and center). In contrast, dispersions prepared using commercial Products A (not shown) or B (FIG. 8, right), were unstable, showing complete separation and settling of solid material within about one day.

From the foregoing, it will be appreciated that specific embodiments of the invention have been described herein for purposes of illustration, but that various modifications may be made without deviating from the scope of the invention.

What is claimed is:

1. A method to prepare a graphene material comprising the steps of:

(a) dispersing graphite powder in a solvent to form a dispersion;

(b) shearing the dispersion with a high shear rate between $10^6$ and $10^9$ $s^{-1}$ to exfoliate the graphite into a graphene material;

(c) heating the sheared dispersion of step (b) within 12 and 48 hours from room temperature to above the critical temperature of the solvent, to reach supercritical conditions of the solvent and maintain supercritical conditions for a period of time; and (d) drying the graphene material by removing the solvent from the dispersion while the dispersion is held above the critical temperature of the solvent, to preserve the exfoliated condition of the graphene material.

2. The method of claim 1, wherein the dispersing in step (a) comprises homogenizer mixing, mechanical stirring, sonication, rotor-stator mixing, or any combination thereof.

3. The method of claim 1, wherein the shearing step of (b) comprises passing the dispersion through an orifice under pressure.

4. The method of claim 1, wherein the concentration of graphite powder in the solvent is between 3 and 48 g/L.

5. The method of claim 1, wherein the solvent is isopropyl alcohol.

6. The method of claim 3, wherein the orifice size is less than 200 μm.

7. The method of claim 3, wherein the pressure is 20,000 psi or more.

8. The method of claim 3, wherein the dispersion is passed through an orifice between 50 times and 150 times.

9. The method of claim 1, wherein step (c) and (d) are conducted with the dispersion inside a pressure vessel or autoclave.

10. The method of claim 1, wherein in step (d), the solvent is removed from the dispersion such that the rate of pressure drop is between 1 and 10 psi/min.

11. A method to prepare a graphene material comprising the steps of:

(a) dispersing graphite powder in a solvent to form a dispersion;

(b) shearing the dispersion with a high shear rate between $10^6$ and $10^9$ $s^{-1}$ to exfoliate the graphite into a graphene material;

(c) heating the sheared dispersion of step (b) to reach supercritical conditions of the solvent and maintain supercritical conditions for a period of time; and (d) drying the graphene material by removing the solvent from the dispersion such that the rate of pressure drop is between 1 and 10 psi/min, while the dispersion is held above the critical temperature of the solvent, to preserve the exfoliated condition of the graphene material.

12. The method of claim 11, wherein the dispersing in step (a) comprises homogenizer mixing, mechanical stirring, sonication, rotor-stator mixing, or any combination thereof.

13. The method of claim 11, wherein the shearing step of (b) comprises passing the dispersion through an orifice under pressure.

14. The method of claim 11, wherein the concentration of graphite powder in the solvent is between 3 and 48 g/L.

15. The method of claim 11, wherein the solvent is isopropyl alcohol.

16. The method of claim 13, wherein the orifice size is less than 200 μm.

17. The method of claim 13, wherein the pressure is 20,000 psi or more.

18. The method of claim 13, wherein the dispersion is passed through an orifice between 50 times and 150 times.

19. The method of claim 11, wherein step (c) and (d) are conducted with the dispersion inside a pressure vessel or autoclave.

20. The method of claim 11, wherein in step (c), the dispersion is heated within 12 and 48 hours from room temperature to above the critical temperature of the solvent.

* * * * *